United States Patent [19]

Hasegawa et al.

[11] Patent Number: 4,760,514
[45] Date of Patent: Jul. 26, 1988

[54] DATA TRANSMISSION SYSTEM WITH FLEXIBLE ERROR RECOVERY

[75] Inventors: Toshitsugu Hasegawa, Kudamatsu; Hiroaki Yabu, Hikari, both of Japan

[73] Assignee: Hitachi, Ltd., Tokyo, Japan

[21] Appl. No.: 699,553

[22] Filed: Feb. 8, 1985

[30] Foreign Application Priority Data

Feb. 10, 1984 [JP] Japan .................................. 59-21610

[51] Int. Cl.⁴ ...................... G06F 13/12; G06F 11/00; G05B 9/02
[52] U.S. Cl. .................................. 364/200; 364/184; 371/11
[58] Field of Search ... 364/200 MS File, 900 MS File, 364/474, 131–136, 138, 139, 184; 371/5, 11

[56] References Cited

U.S. PATENT DOCUMENTS

| | | | |
|---|---|---|---|
| 3,668,653 | 6/1972 | Fair et al. | 364/200 |
| 3,997,879 | 12/1976 | Markley et al. | 364/900 |
| 4,106,091 | 8/1978 | Hepworth et al. | 364/200 |
| 4,174,536 | 11/1979 | Misunas et al. | 364/200 |
| 4,513,379 | 4/1985 | Wilson et al. | 364/900 |
| 4,550,375 | 10/1985 | Sato et al. | 364/474 |
| 4,608,689 | 8/1986 | Sato | 371/5 |

Primary Examiner—Gareth D. Shaw
Assistant Examiner—Rebecca L. Adams
Attorney, Agent, or Firm—Antonelli, Terry & Wands

[57] ABSTRACT

The system comprises a central processing unit which processes received data, a memory unit which stores programs required for the operations of this central processing unit and other data, a data transmission adapter which receives the data, an output control unit which delivers the received data to each output end under the control of said central processing unit, and a mode setting unit which stores output mode data for setting an output mode at each output end when the received data are abnormal. When the received data are abnormal, the output mode data and the output data outputted already to the output control unit are taken in, said output data are modified into those in an output mode designated by the output mode data, and the output data thus modified are delivered to the output control unit.

8 Claims, 5 Drawing Sheets

TRANSMIT DATA REGISTER

STATUS REGISTER

RECEIVE DATA REGISTER

DATA TRANSMISSION SYSTEM WITH FLEXIBLE ERROR RECOVERY

BACKGROUND OF THE INVENTION 1. (Field of the Invention)

The present invention relates to a data transmission system in which a data output is controlled properly when any error or abnormality is detected in the data received.

2. (Disclosure of Prior Art)

Signal transmission systems are used for data transmissions between computer systems, or between a computer and industrial machines, for instance. As systems in generally are highly advanced and become highly reliable, the signal transmission systems are required also to be of higher grade and higher reliability than ever. In these circumstances, the recent signal transmission systems are provided with functions of checking to determine whether data is transmitted without fail or whether there is any abnormality in the data, or the like. When some abnormality is detected in the signal transmission system provided with such abnormality detecting functions as described above, various measures may be taken, such as all output signals may be interrupted forcedly, or the data received just before the detection of the abnormality may be retained, or the state of abnormality may be displayed in a display device, or the like.

It is not preferable, however, to take the measure that all the outputs at the output device, such as the digital output card or analogue output card, are cleared to zero, or that the data received just before detection of some abnormality is retained indiscriminately, when the received data contains an abnormality, because this measure excludes the flexibility at each output device. In other words, there are cases in which a preceding state (data) should be retained at one output device while it should be cleared to zero at another, and it can not be regarded as preferable in these cases that an indiscriminate data control is given to all of the output devices.

SUMMARY OF THE INVENTION

An object of the present invention is to provide a data transmission system in which an output mode can be set for each output device when received data contains some error or abnormality.

The present invention is characterized in that it contains a central processing unit which processes the received data, a memory unit which stores programs required for the operations of said central processing unit and the received data, a data transmission adapter which receives the data transmitted through a transmission path, an output control unit which delivers said received data to each output terminal under the control of said central processing unit, and a mode setting unit which stores the output mode data for setting an output mode at each output terminal, and in that, when the received data is abnormal, the central processing unit reads in said output mode data and the output data obtained just before the detection of the abnormality and delivered already to that output control unit, modifies said output data into an output mode designated by the output mode data, and delivers the modified output data to the output control unit.

Other objects and characteristics of the present invention will be made apparent from the following description.

EMBODIMENT OF THE INVENTION

The present invention will be described in detail with reference to the drawings.

Figure 1:
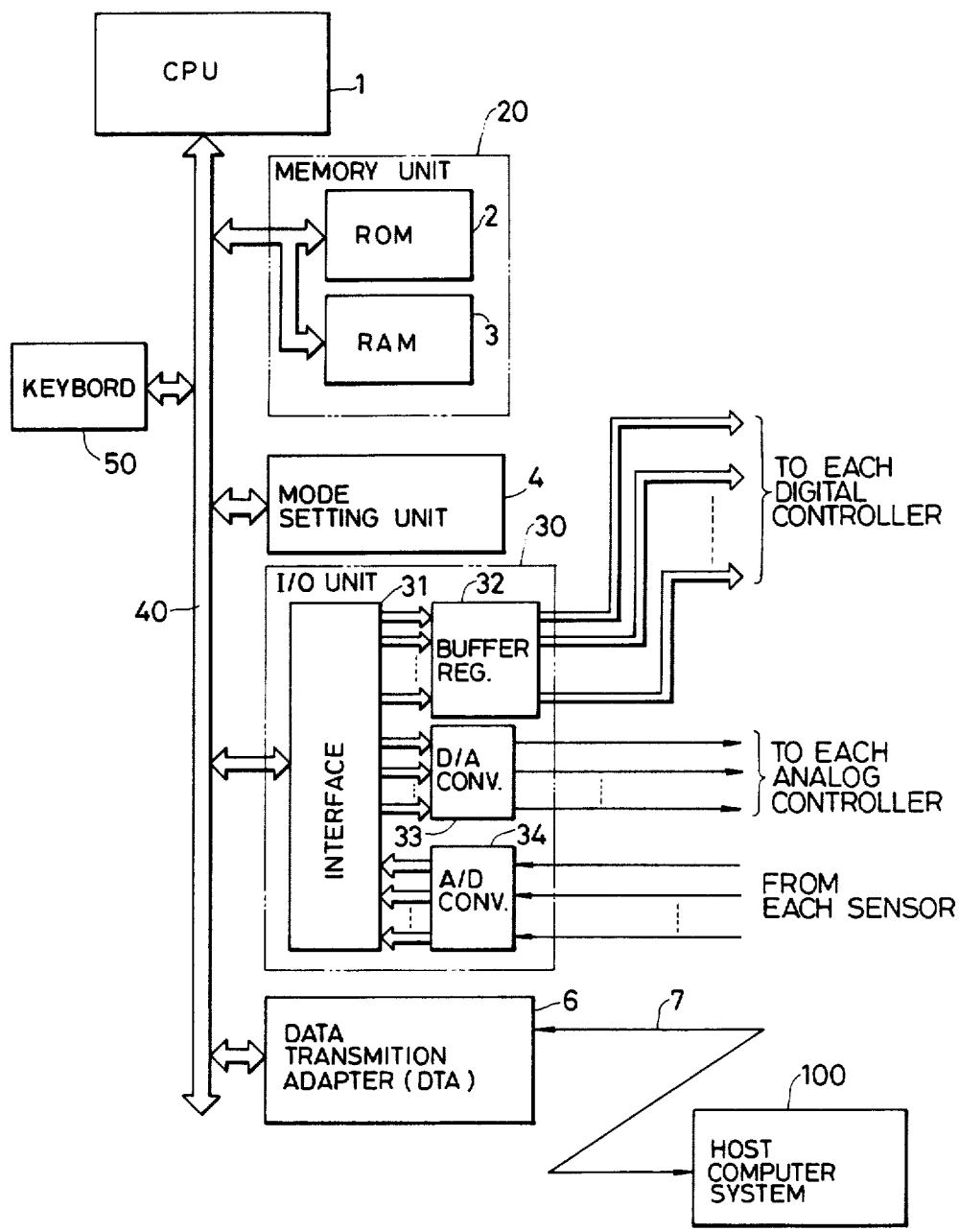
FIG. 1 is a general block diagram relating to one embodiment of the present invention.

FIG. 1 is a block diagram showing one embodiment of the present invention. In this figure, a central processing unit 1 performs such processings as input/output of data, arithmetic processing of data and storage of data. A memory unit 20 is provided for storing programs required for the operations of the CPU 1 and inputted data or processed data. In this embodiment, programs are stored in a read-only memory (ROM) 2, and other data in a random access memory (RAM) 3 which can perform read/write operations. A mode setting unit 4 is provided for setting the output mode data which determines an output mode for each output device when any abnormal data is received. The details of the output mode data and a method of data transmission using the output mode data will be described later. The setting of the output mode data can be realized by writing the data beforehand in this unit 4 for each and every output device to be controlled. The output mode setting unit 4 may be as a ROM or RAM. Its operation can be realized also by storing the data in specified addresses of the memory unit 20, and in this case it is unnecessary to provide the output mode setting unit 4. A bus 40 is a signal line employed for the data transmission between units, and it contains an address bus, a data bus and a control bus. Each unit is connected to the bus 40, outputting data onto the bus and inputting data therefrom under the control of CPU 1. An input/output control unit (I/O unit) 30 is used for delivering a control signal, an instruction signal or the like to an object to be controlled (e.g. a crane) and inputting signals (e.g. signals from sensors) from the object to be controlled. The I/O unit 30 is composed of an interface 31, a buffer register 32, a digital-analog (D/A) converter 33 and an analog-digital (A/D) converter 34. The interface 31 performs controls for delivering the data transmitted from CPU 1 to a designated output device and for transmitting the data inputted from an input device to the CPU 1. The D/A converter 33 converts an inputted digital signal into an analog signal. The A/D converter 34 converts an inputted analog signal into a digital signal. A data transmission adapter (DTA) 6 is provided for framing serial data and delivering same to the bus 40, and delivering the parallel data delivered to the bus 40 onto a communication line as serial data. DTA 6 in this embodiment has the function of checking errors in received data. A keyboard 50, connected to the bus 40, is used for setting the output mode data in the mode setting unit 4 through CPU 1 or directly. By the way, any other means may be utilized for setting the output mode data (writing the data, in this case). For instance, a mode setting switch, which is operated by an operator, may be provided in the mode setting unit 4 for this purpose. A host computer system 100 is equipped with a data transmission system to transmit various data to DTA 6 via a signal line 7. Moreover, it receives the data transmitted from DTA 6 and performs a necessary processing based thereon. A control instruction for each controller, or information, such as setting information, is outputted through the I/O unit 30. In this embodiment, the output to a digital controller is realized by setting data in the buffer register 32. The output to an analog controller is performed by digital-to-analog conversion through the D/A converter 33. The amount of the physical state of each element in an object to be controlled, or the state of sequence thereof, is detected by sensors. The outputs of these sensors are used not only for the controlling operation conducted by each controller, but also for monitoring the state of the object to be controlled. In the embodiment shown in FIG. 1, the outputs of the sensors are inputted to be stored in the memory. More concretely, the output of each sensor detected as an analog amount is inputted to the A/D converter 34 in the I/O unit 30 and converted into a digital amount therein. CPU 1 stores the output of the sensor thus converted in the memory unit 20 via the interface 31 and the bus 40.

Each unit shown in FIG. 1 is well-known to the persons skilled in the art. First, an 8-bit microprocessor is used as the CPU 1. As the 8-bit microprocessor, HD6800 manufactured by Hitachi, Ltd. can be used, for instance. As memories (ROM 2, RAM 3 and the output mode setting unit 4), LSI memories which are known well are employed. For I/O 30 a D/A converter, an A/D converter and a bus interface which are known may be used. For the bus interface a model HD6821 manufactured by Hitachi, Ltd. can be used. As for the data transmission adapter 6, any device which can convert transmitted serial data into parallel data and deliver this onto the bus may be used, and in this embodiment, an LSI developed as an adapter for interfacing serial communication data onto a system bus is used. A model HD6850 made by Hitachi, Ltd. is an example of such an LSI.

Figure 2:
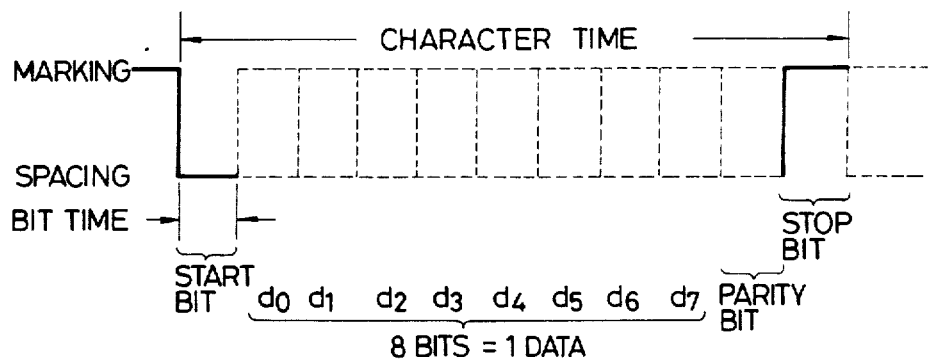
FIG. 2 shows a data structure of received data.
Figure 3:
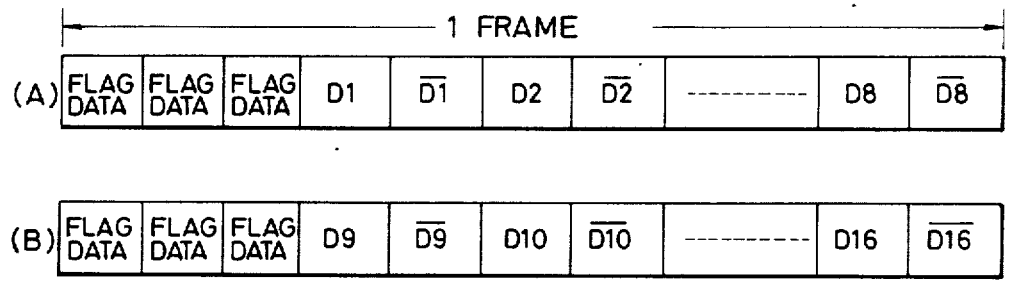
FIG. 3 shows a data structure of received data of one frame.

The operations in the embodiment of FIG. 1 are as follows. CPU 1 reads out sequentially a signal transmission processing program stored in ROM 2 to execute data transmission, arithmetic processing and data checking, etc. The serial transmission data outputted from the host computer system 100 is inputted to DTA 6 through the signal line 7. DTA 6 converts the serial data into parallel data and delivers this onto the bus 40. FIGS. 2 and 3 show examples of the data structures of the serial transmission data inputted to DTA 6. When one unit of data is formed of eight bits, one start bit is put in front of the data, and one parity bit and one stop bit are put behind them, as shown in FIG. 2. Accordingly, one unit of data is formed of eleven bits. The start bit, parity bit and stop bit are inserted into the data on the transmission side and deleted on the reception side. On transmission, a plurality of data (eight data, for instance) as shown FIG. 2 are made serial and taken as one frame, which is transmitted as one unit. FIG. 3 exemplifies arrangements of data of one frame. An arrangement (A) or (B) of FIG. 3 forms one frame, and according to either of these examples, flag data is transmitted three times first and eight data units are transmitted subsequently. These examples show an invert double-serial transmission system in which each unit of data is accompanied subsequently by the inverted data thereof in transmission. In DTA 6, the data transmitted as shown in FIG. 3 is converted into parallel data, and the parallel data is then delivered onto the data bus.

Figure 4:
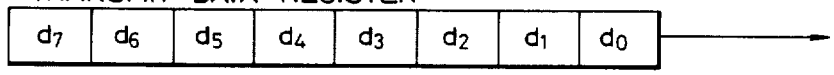
FIG. 4 shows registers in a data transmission adapter.
Figure 4:
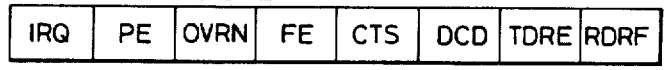
Figure 4:
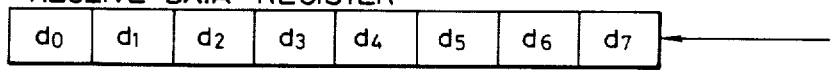

The following is a description of the function of DTA 6. DTA 6 described herein contains three registers as shown in FIG. 4. A transmit data register is employed for the transmission of data of one byte. When any data is written in this register, the adaptor 6 converts the parallel data into serial data according to the data structure shown in FIG. 2 and delivers (transmits) same. A receive data register takes in one bit serial data inputted according to the data structure shown in FIG. 2 and holds (receives) same as parallel data. When the serial data is inputted, DTA 6 performs a parity check, a framing check and an overrun check, and the results of checking are set in a status register. More concretely, "1" is set in the bit PE of the status register when a parity error is detected, and "1" is set in the bit FE of the same register when a framing error is detected, while "1" is set in the bit OVRN in the case of an overrun error. The framing error means that the data structure of received data is not in accordance with the structure shown in FIG. 2. The overrun error means that data inputted in the receive data register fails to be read out by CPU 1 before the subsequent data is inputted thereto. With the content of the status register of DTA 6 being inputted, CPU 1 can recognize the presence and absence of errors in the data set in the receive data register.

Figure 5A:
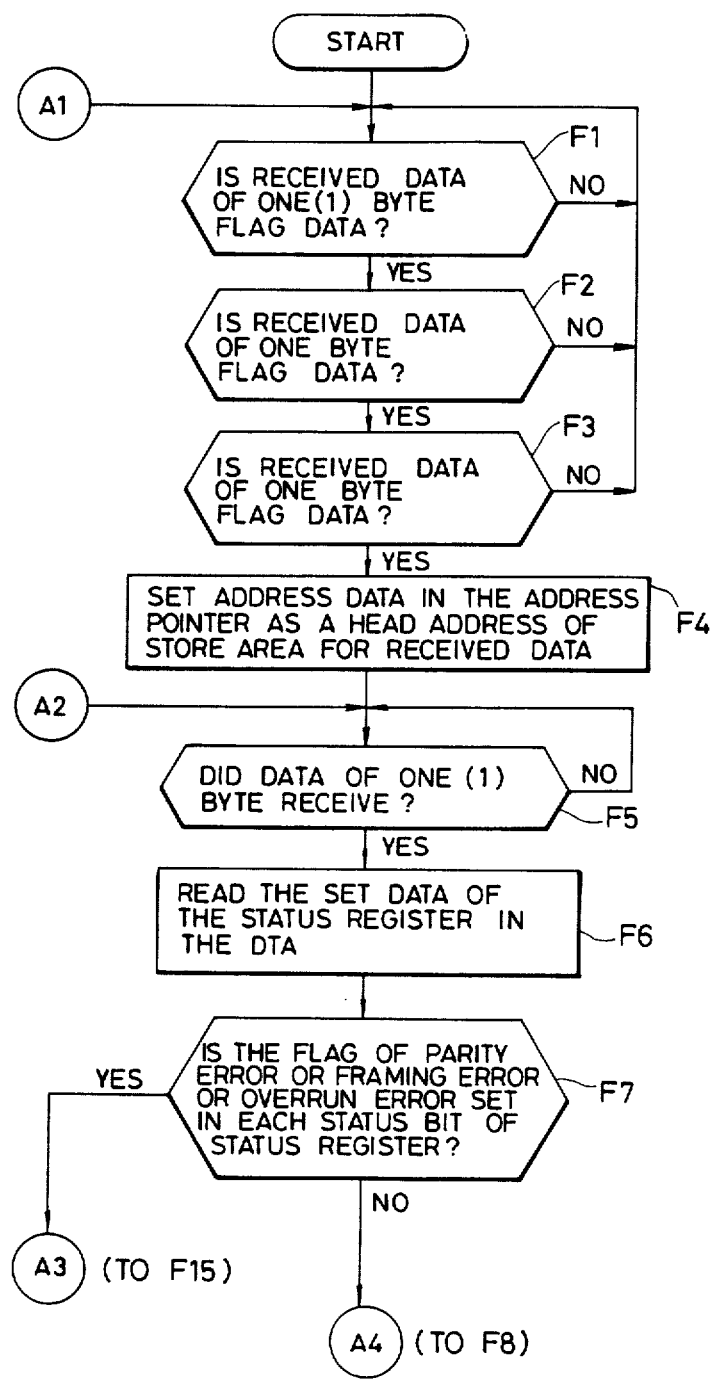
FIGS. 5A, 5B and 5C are flow charts of the activity of the system shown in FIG. 1.
Figure 5B:
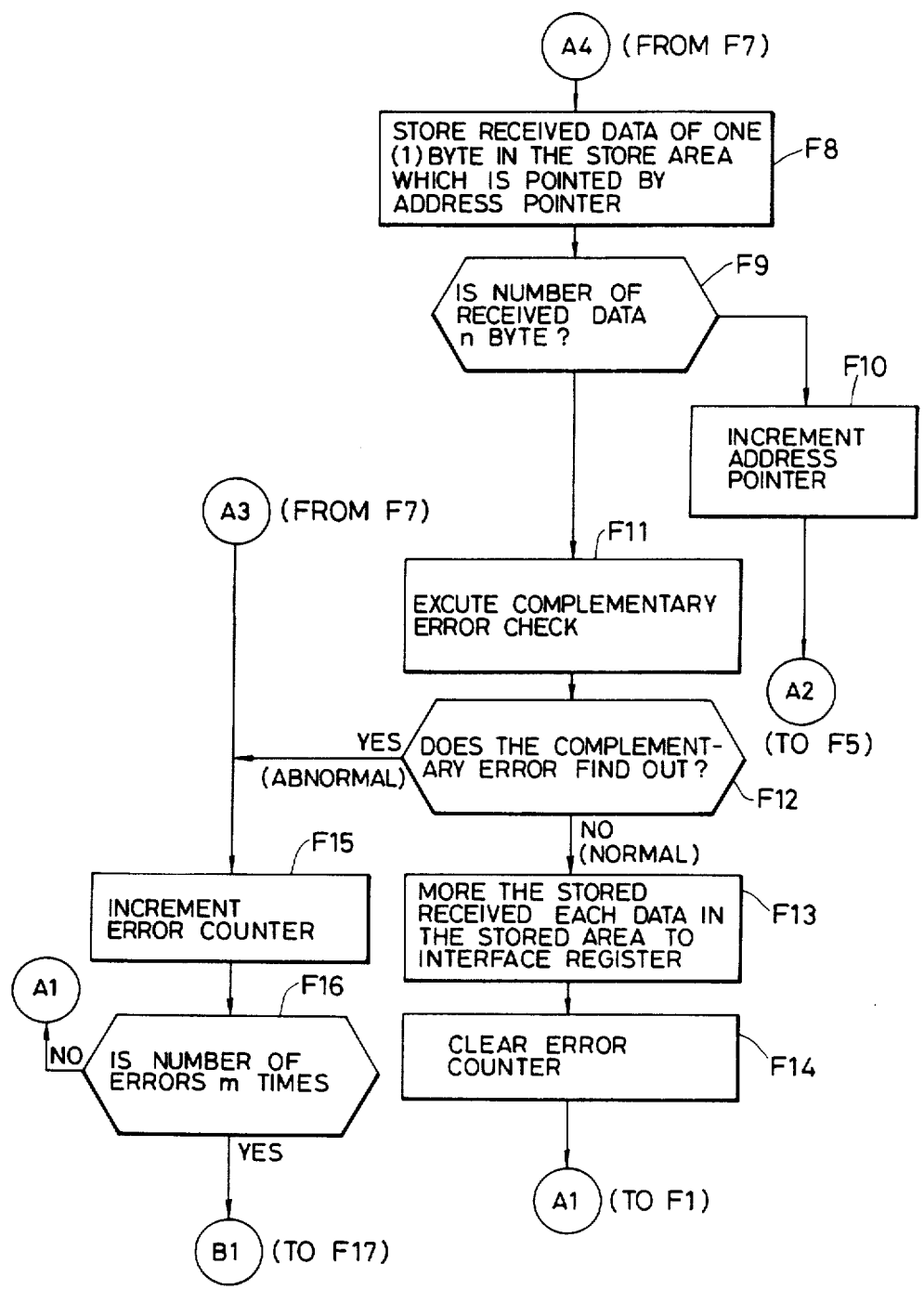
Figure 5C:
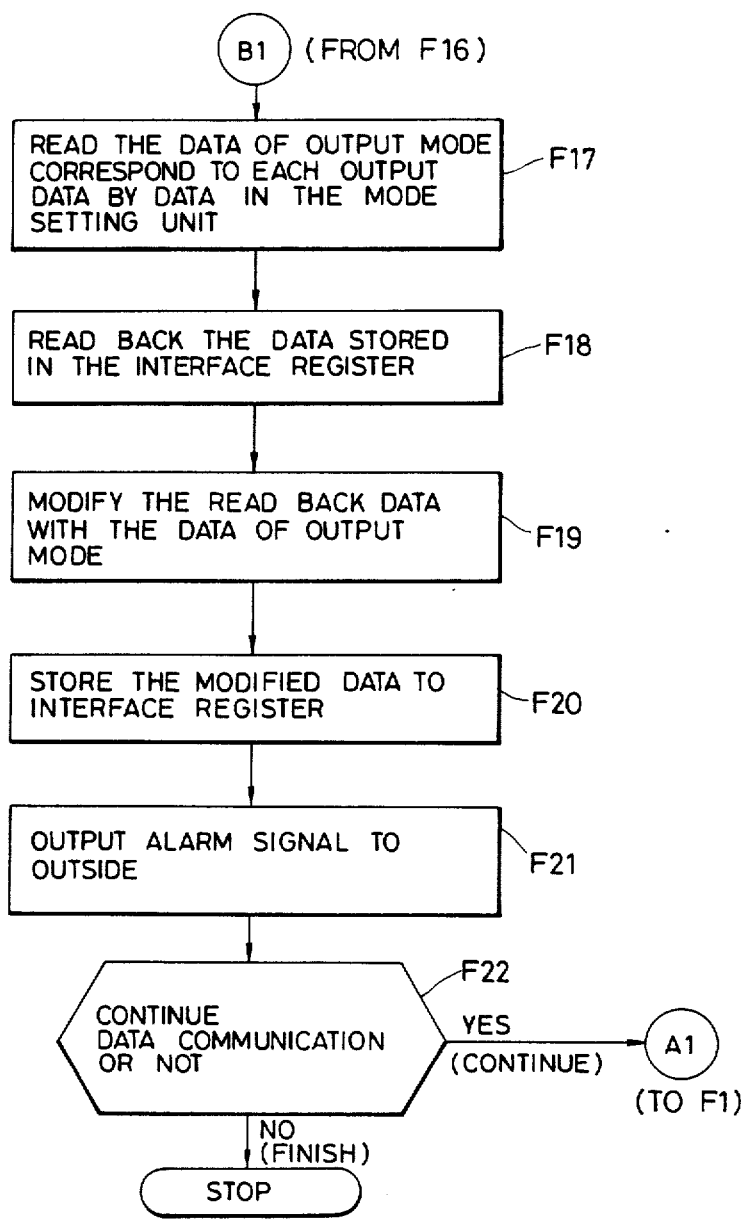

Next, the way of data transmission in the transmission system shown in FIG. 1 will be described according to flow charts shown in FIGS. 5A to 5C. The description will be made of the operation of reception, since this method is featured by the processing of data errors when they are received. The amount of received data of one frame is assumed to be n bytes, and the number of tolerable errors to be m times. First, DTA 6 receives data and delivers an interrupt signal to CPU 1, and thereby the operations shown in FIGS. 5A to 5C are started. Since the transmitted data is flag data, as shown in FIG. 3, a decision is repeated until three successive transmissions of said data are ended. Steps taken in this process are steps F1 to F3. When the flag data is received three times, an advance is made to the subsequent step F4. At the step F4, the head address of those storage locations in which data to be memorized is stored is set at an address pointer so that data to be received from the subsequent time onward (data D1 to D8 in FIG. 3 (A)) may be stored in RAM 3 in units of one byte. The set value of this pointer is renewed by +1 every time when data of one byte is received. At a step F5, a decision is made as to whether the data of one byte is received by the receive data register in DTA 6. When the reception of the data of one byte is confirmed by this decision, an advance is made to a step F6. At the step F6, the content of the status register in DTA 6 is inputted to CPU 1. At a step F7, the content of this status register is checked so as to detect the presence or absence of errors in the data received at the step F5. When no error is found by the decision, an advance is made to a step F8, at which the received data is stored in an address indicated by the address pointer in RAM 3. Next, at a step F9, it is decided whether the amount of the received data reaches n bytes set beforehand. If the number of the received data is less then n, an advance is made to a step F10, +1 is added to the content of the address pointer, and a return is made to the processing at the step F5. When the number of the received data reaches n (the number of data of one frame) set beforehand, an advance is made to a step F11. At the step F11, the received data is correlated by using data received by the invert double-serial transmission. This correlation (invert double-serial transmission check) is performed in the following way. When data Di of one byte is assumed to be "01010101", the transmitter side (host computer system 100) transmits this Di first, and then transmits data $\overline{Di}$ obtained by inverting said original data Di, i.e. "10101010". On the receiver side (CPU 1), the data Di is subjected to inversion by each bit and correlated with the received data Di, and it is decided that the received data Di contains an error when there is even one bit which does not correlate properly. When the checkings at steps F11 and F12 confirm that all the data received for one frame is normal, an advance is made to a step F13. At the step F13, original data D1, D2 ... Di, ... Dn of the one-frame data D1, $\overline{D1}$, D2, $\overline{D2}$, ... Di, $\overline{Di}$, ... Dn, $\overline{Dn}$ which is stored in RAM 3 is written in an interface register of the I/O unit 30 (a register provided in the interface 31). The I/O unit 30 delivers the written data D1, D2, ... Di, ... Dn to corresponding controllers respectively. The data for a digital controller is delivered thereto through the buffer register 32. The data for an analog controller is delivered thereto through the D/A converter 33. In CPU 1, an error counter is cleared to zero (at a step F14) after the processing at the step F13 is ended, and a return is made to the step F1 for the reception of subsequent data of one frame. If no subsequent data of one frame is received, this processing is ended. The presence and absence of the reception of data can be decided on the basis of the presence and absence of an interrupt signal from DTA 6.

The above-described reception processing relates to the case when the received data is normal. The following is a description of the processing applied when the received data contains an error or abnormality. When a parity error, an overrun error or a framing error is detected at the step F7, an advance is made to a step F15, at which the count of an error counter is incremented by +1. Even after the advance is made to the step F8 based on the decision of no problem at the step F7, the same advance to the step F15 as mentioned above is made when any abnormality is found at the step F12. At a step F16, it is decided whether the count number of the error counter reaches the number m set beforehand, and when the number m is not yet reached, a return is made to the step F1, at which the reception processing of subsequent data of one frame is started. When the error count is found to be m at the step F16, an advance to a step F17 is made in CPU 1. At the step F17, the output mode data (which is set for each output device) stored in the mode setting unit 4 is read out. Next, an advance is made to a step F18, and output data for each controller which is held currently in the interface register of the I/O unit 30 is read back. At a subsequent step F19, the output data read in at the step F18 is modified according to the output mode data read at the step F17. In other words, an output operation mode for each controller of the system which is adopted when any abnormality is detected in the transmission system is determined at said step F19. This processing is performed, for instance, in the following way. It is assumed that output data is sequence data by one bit and that said output data of one byte is written in the interface register as "11001100", for instance. When the output mode data corresponding to said output data of one byte is "10011001", a bit with "1" set in the output mode data holds the current value, while a bit with "0" is reset. Namely, the data of "11001100" outputted to the interface register is modified to be "10001000" in accordance with the output mode data. The data thus modified is written in the interface register at a step F20. As for the output data whose one unit is the data of one byte, this data is also modified according to the output mode data stored in the unit 4. The output modes in this case are roughly classified into three kinds: (a) the mode in which a current value is maintained; (b) the mode in which the value is cleared to be zero; and (c) the mode in which the value is changed to another appropriate value. As the data indicating these modes, the mode (a) is set as "1111", the mode (b) as "0000", and the mode (c) as "0111", for instance. This data (output mode data) is set and stored in the unit 4 for each output end. Therefore, the data read back at the step F18 can be modified according to the output mode data read at the step F17. When output mode data for some output end is "1111" corresponding to mode (a), for instance, and when data currently outputted to said output device (data held in the interface register) is "11000011", the data obtained by the above modification is the same "11000011". When said output mode data is "0000" corresponding to mode (b), the data obtained by the modification is modified to be "00000000". When this processing (step F19) is ended, an advance is made to the step F20. At the step F20, the modified data is written in the interface register of the I/O unit 30. The I/O unit 30, in its turn, delivers the modified data to each controller. At step F21, the presence of the abnormality in the received data is indicated to the outside. At a step F22, it is decided whether data transmission is to be further continued, and a return is made to the step F1 when the transmission is continued. The processing is ended when it is not continued.

As described above, when received data is abnormal successively in the set number of times (m), said data can be modified by each unit of output data according to output mode data stored beforehand, and can be delivered to each corresponding output end. On the occasion when there is any abnormality in the received data, therefore, a data output can be executed in accordance with the conditions of each controller which receives said data and performs control, and thus the safety and reliability of the system can be improved.

I claim:

1. A data transmission system comprising a central processing unit which processes received data; a data transmission adapter connected to receive the data transmitted through a transmission path; an output control unit for delivering said received data to at least one output terminal under the control of said central processing unit; and a mode setting unit which stores output mode data for setting an output mode for each output terminal; wherein said central processing unit includes abnormality detecting means for determining when the received data is abnormal means responsive to said detecting means for reading said output mode data from said mode setting unit and output data in said output control unit obtained just before the detection by said abnormality detecting means of an abnormality in received data which has been delivered already to said output control unit, means responsive to said output mode data for modifying said output data or for leaving said output data unmodified, and means for delivering the modified or unmodified output data to said output control unit.

2. A data transmission system according to claim 1, wherein said data transmission adapter includes a status register and means for detecting errors in the received data and for setting the result of said error checking in said status register, while said abnormality determining means in said central processing unit comprises means responsive to the content of said status register of said data transmission adapter for determining the presence or absence of any abnormality in the received data.

3. A data transmission system according to claim 1, wherein said mode setting unit in which said output mode data are stored comprises a memory unit of said central processing unit.

4. A data transmission system according to claim 1, wherein said abnormality detecting means in said central processing unit includes means for checking for errors in the received data.

5. A data transmission system according to claim 1, wherein said abnormality detecting means indicates the presence of an abnormality in received data only when a predetermined number of errors greater than one are detected in that received data.

6. A data transmission system according to claim 1, having a plurality of output terminals, including digital terminals and analog terminals, and wherein said mode setting unit stores the output mode data for setting an output mode bit by bit for each digital terminal and as certain words for each analog terminal, said central processing unit operating to effect a modification of output data by multiplying output mode data and the output data logically for a digital terminal or by increasing or decreasing the output data by referring to the output mode data, which represents a degree of increase or decrease, for an analog terminal.

7. A data transmission system comprising a central processing unit which processes received data; a data transmission adapter which receives the data transmitted through a transmission path; a memory unit which stores a program required for the operations of said central processing unit and received data which is delivered from said data transmission adapter and output mode data for setting an output mode for each of a plurality of output terminals; and an output control unit which delivers said received data to each output terminal under the control of said central processing unit; said central processing unit including means responsive to detection of an abnormality received data for reading in said output mode data and the output data in said output control unit obtained before the detection of the abnormality, and for operating to maintain the output data the same as it appeared just before the detection of the abnormality or to modify the output data according to the output mode data which is stored in said memory unit.

8. A data transmission system according to claim 7, in which said output terminals include digital terminals and analog terminals, and wherein said mode setting unit stores the output mode data for setting an output mode bit by bit for each digital terminal and as certain words for each analog terminal, and said central processing unit performs modification of output data by multiplying output mode data with output data logically for a digital terminal and for increasing or decreasing output data by referring to the output mode data, which represents the degree of increase or decrease, for an analog terminal.

* * * * *